(12) United States Patent
Lovo et al.

(10) Patent No.: US 12,151,828 B2
(45) Date of Patent: Nov. 26, 2024

(54) DOOR FOR A VEHICLE PROVIDED WITH AN IMPROVED SECURITY SYSTEM

(71) Applicant: MECAER AVIATION GROUP S.P.A., Borgomanero (IT)

(72) Inventors: Francesco Lovo, Borgomanero (IT); Giorgio Santero, Borgomanero (IT); Sergio Spezzacatena, Borgomanero (IT)

(73) Assignee: MECAER AVIATION GROUP S.P.A., Borgomanero (IT)

( * ) Notice: Subject to any disclaimer, the term of this patent is extended or adjusted under 35 U.S.C. 154(b) by 0 days.

(21) Appl. No.: 18/273,232

(22) PCT Filed: Jan. 21, 2022

(86) PCT No.: PCT/IB2022/050549
§ 371 (c)(1),
(2) Date: Jul. 19, 2023

(87) PCT Pub. No.: WO2022/157711
PCT Pub. Date: Jul. 28, 2022

(65) Prior Publication Data
US 2024/0109669 A1 Apr. 4, 2024

(30) Foreign Application Priority Data
Jan. 21, 2021 (IT) .................. 102021000001031

(51) Int. Cl.
*E05B 17/10* (2006.01)
*B64C 1/14* (2006.01)
(Continued)

(52) U.S. Cl.
CPC ............ *B64D 45/00* (2013.01); *B64C 1/1407* (2013.01); *E05B 17/10* (2013.01); *E05C 9/063* (2013.01)

(58) Field of Classification Search
CPC .. B64D 45/00; B64D 45/0005; B64C 1/1407; E05B 17/10; E05B 83/12; E05C 9/063; E05C 9/06
(Continued)

(56) References Cited

U.S. PATENT DOCUMENTS

| | | | |
|---|---|---|---|
| 3,947,088 A * | 3/1976 | French | G02B 6/2808 356/418 |
| 4,091,280 A * | 5/1978 | Ellis | G01D 5/268 250/227.21 |

(Continued)

FOREIGN PATENT DOCUMENTS

| | | | | |
|---|---|---|---|---|
| CN | 108716326 A | * | 10/2018 | ............. E05B 15/00 |
| CN | 111749562 A | * | 10/2020 | |

(Continued)

OTHER PUBLICATIONS

International Search Report and Written Opinion issued in connection with International Application No. PCT/IB2022/050549, dated Apr. 21, 2022 (13 pages).

(Continued)

*Primary Examiner* — Jerry E Redman
(74) *Attorney, Agent, or Firm* — KLINTWORTH & ROZENBLAT IP LLP

(57) ABSTRACT

A door for an aircraft is configured to be selectively closed on a frame. The door includes a safety system for an anchoring element. The safety system includes a source of light radiations and a receptor of said radiations, the source being integral with the door and the receptor being integral with the anchoring element. The receptor is optically connected to signalling apparatus that signals the positioning of the anchoring element in the second operating condition when the receptor receives the light radiation from the source.

10 Claims, 3 Drawing Sheets

(51) Int. Cl.
*B64D 45/00* (2006.01)
*E05C 9/06* (2006.01)

(58) Field of Classification Search
USPC .............................................. 49/13, 394, 395
See application file for complete search history.

(56) References Cited

U.S. PATENT DOCUMENTS

| | | | | |
|---|---|---|---|---|
| 4,796,966 A | * | 1/1989 | Kovaleski | G02B 6/3572 |
| | | | | 250/227.3 |
| 10,746,378 B2 | | 8/2020 | Bachman et al. | |
| 11,860,005 B2 | * | 1/2024 | Peters | G02B 6/3873 |
| 2014/0347674 A1 | | 11/2014 | Anderson | |
| 2021/0079688 A1 | * | 3/2021 | Shumaker | E05B 13/101 |
| 2022/0139140 A1 | * | 5/2022 | Eller | E05B 17/10 |
| | | | | 70/278.7 |
| 2023/0146434 A1 | * | 5/2023 | Kathiresan | G06F 3/011 |
| | | | | 345/633 |
| 2023/0407685 A1 | * | 12/2023 | Conkling | B64C 1/1407 |
| 2024/0109669 A1 | * | 4/2024 | Lovo | B64C 1/1407 |

FOREIGN PATENT DOCUMENTS

| | | | | |
|---|---|---|---|---|
| CN | 115559648 A | * | 1/2023 | |
| CN | 116065897 A | * | 5/2023 | |
| DE | 102016105986 | | 10/2017 | |
| EP | 3770062 A1 | * | 1/2021 | ........... B64C 1/1407 |

OTHER PUBLICATIONS

PCT Direct Letter in respect of International Application claiming priority to IT Patent Application No. 102021000001031 filed Jan. 21, 2021, Applicant, Mecaer Aviation Group S.P.A. (2 pages).

* cited by examiner

DOOR FOR A VEHICLE PROVIDED WITH AN IMPROVED SECURITY SYSTEM

CROSS-REFERENCE TO RELATED APPLICATIONS

This patent application claims priority from Italian patent application no. 102021000001031 filed on Jan. 21, 2021, the entire disclosure of which is incorporated herein by reference.

TECHNICAL SECTOR

This invention relates to a door, in particular to a safety system for a door, more particularly a closing system for this vehicle door.

This invention finds application, though not exclusively, in an aircraft door.

Reference will be made to this application below by way of example, though it is clear that the door of the invention may be applied to any vehicle type and, more generally, to any application that, for safety reasons, requires control, including remote control, of the correct closing of a mechanism.

PRIOR ART

Vehicle doors are configured to assume, as known, a first operating condition, closed, in which they isolate an environment of the aircraft from the outside environment, and a second operating condition, open, in which they allow passage between the environment of the aircraft and the outside environment.

One example of these doors may be provided by the doors of helicopters or of fixed-wing aircraft, both before performing flight operations and during the latter, for operating reasons (merely by way of example, for parachuting).

Referring to FIG. 1, this illustrates an example of a door 1' according to the prior art, which can be closed on a frame 2' of an aircraft via a closing system. The latter comprises a mechanical transmission 4' that can be manually driven by a lever 5' to control at least one anchoring element 6' defining an end that is sized to be inserted in or removed from a seat carried fixed by the frame 2' so as to lock or unlock the door 1' in relation to it. The user, by moving the lever 5', controls the movement of the anchoring element 6' and, thus, the locking/unlocking of the door 1'.

According to regulations, it is necessary to provide visual means 7' designed to enable the direct visualisation of the correct positioning of the anchoring element 6' in relation to the door 1', i.e., to the frame 2'. In particular, these visual means 7' are merely made via an opening 8' wherein a highlighted portion 9', otherwise known as a "flag", of the anchoring element 6' can be visualised.

It is clear, in any case, that the user must move to see in each opening 8' that the respective highlighted portion 9' is in the correct position. In addition, it is clear that this visualisation may be imprecise and difficult according to the light conditions inside the aircraft.

There is, therefore, a need to provide a door enabling the visualisation of the correct closure or opening thereof that is simple, inexpensive, and easy to use.

An additional, known example is described in U.S. Ser. No. 10/746,378 B2 that illustrates a fibre optics system for checking the correct closure of an aircraft door. This system comprises an optical indicator provided with an intermediate element 670 rigidly coupled to the locking mechanism so that the rotation of the mechanism corresponds to the rotation of the intermediate element; and an interruption 665 inside of the fibre optics system 661, 662 designed to receive the intermediate element 670. Specifically, when the intermediate element is housed inside the interruption 665, the light transmitted through the fibre optics system 661, 662 is altered; when the intermediate element is positioned outside the interruption 665, the light travels freely through the fibre optics system.

Clearly, the presence of the intermediate element 670 increases the possibility of accumulating dirt with consequent malfunctions in the system. In addition, the element 670 may break or malfunction so that it can no longer alternate the light in the fibre optics system, signalling the incorrect closure of the door.

The purpose of this invention is to meet the needs outlined above in an optimal and inexpensive way.

SUMMARY OF THE INVENTION

The above-mentioned purpose is achieved with a door comprising a safety system as claimed in the attached independent claims.

Additional, preferred embodiments of the invention are constructed according to the dependent claims or those connected to the independent claims mentioned above.

BRIEF DESCRIPTION OF THE DRAWINGS

To better understand this invention a preferred embodiment is described below, by way of non-limiting example and with reference to the attached drawings, in which.

DETAILED DESCRIPTION OF THE INVENTION

Figure 4:
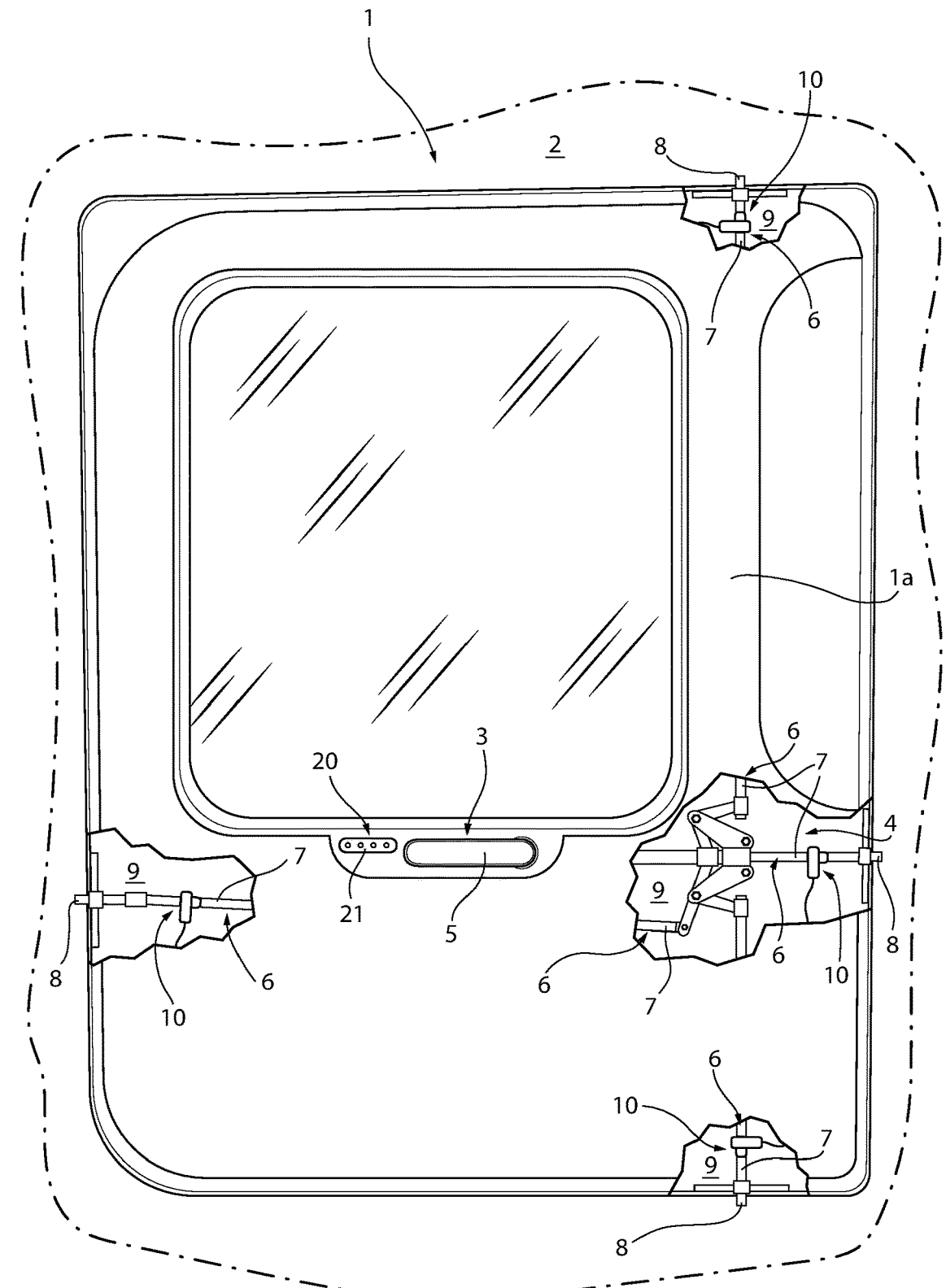
FIG. 4 is a schematic front view illustrating a door comprising a safety system according to the invention.

FIG. 4 illustrates a door 1 for an aircraft configured to be selectively fixed to a frame 2 of the aircraft so as to assume a first operating condition wherein the door 1 is open, i.e., not fixed to the frame 2, and a second operating condition wherein the door 1 is closed, i.e., fixed to the frame 2.

The door 1 comprises, thus, a closing system equipped with actuator means 3 and a mechanical transmission 4 configured to enable the passage from the first to the second operating condition. In particular, the actuator means 3 comprise a handle 5 connected to the mechanical transmission 4.

In particular, the mechanical transmission 4 may be of any type for transmitting motion from the handle 5 to one or more anchoring elements 6 of the closing system.

In particular, each anchoring element 6 may comprise a rod 7 movably carried by the door 1 and equipped with an end portion 8 configured to assume a first condition in which it does not cooperate in contact with a seat carried integrally to the frame 2, leaving the door 1 free to move, and a second condition in which it does cooperate in contact with this seat, thus creating a mechanical coupling to lock the door 1.

In particular, the mechanical transmission 4 and the at least one anchoring element 6 are housed inside a space 9 delimited by walls 1*a* defining the door 1.

According to the invention, the door 1 is provided with a safety system 10 configured to detect the correct position of the at least one anchoring element 6, i.e., to detect the locking/unlocking of the door 1, in particular, in the example described, of the insertion of the end portion 8 into the related seat.

Figure 1:
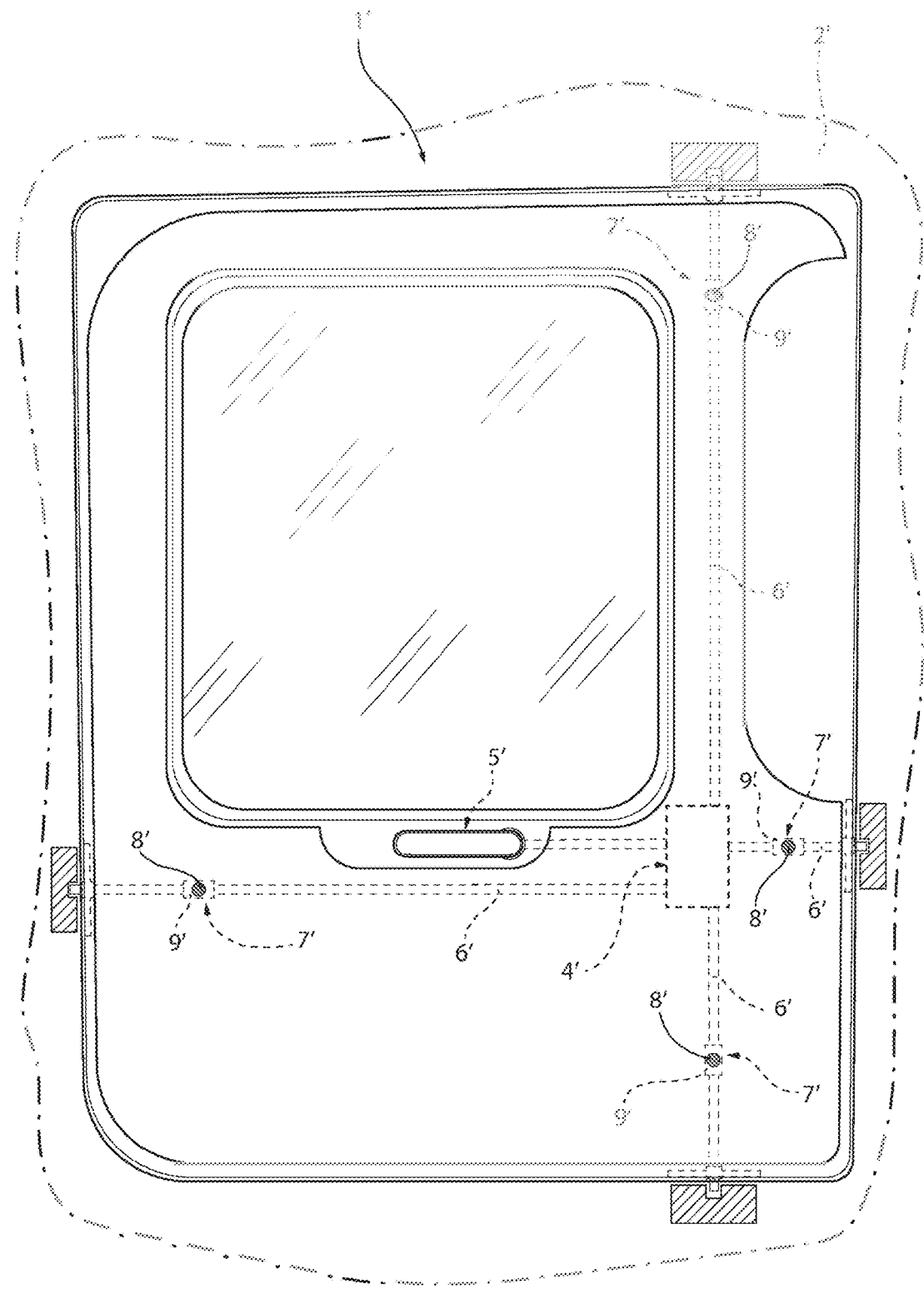
FIG. 1 is a schematic front view illustrating a door according to the prior art.
Figure 3:
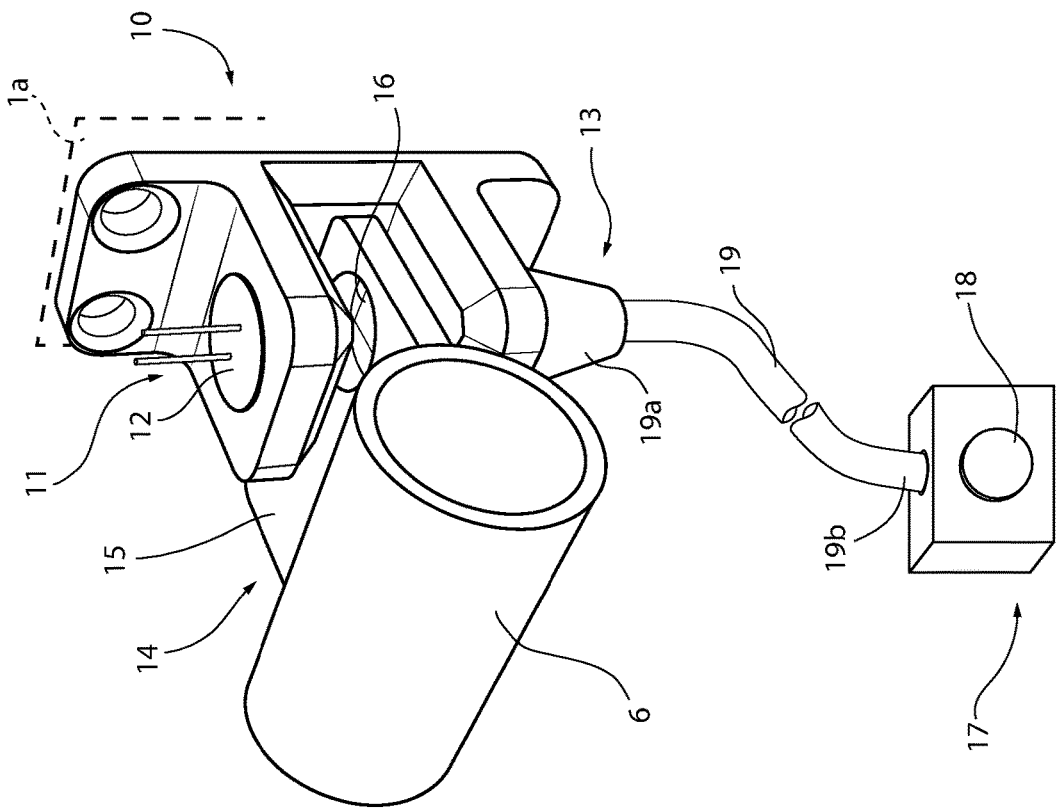
FIG. 3 is a schematic perspective view of a portion of the safety system according to the invention in a second operating condition.
Figure 2:
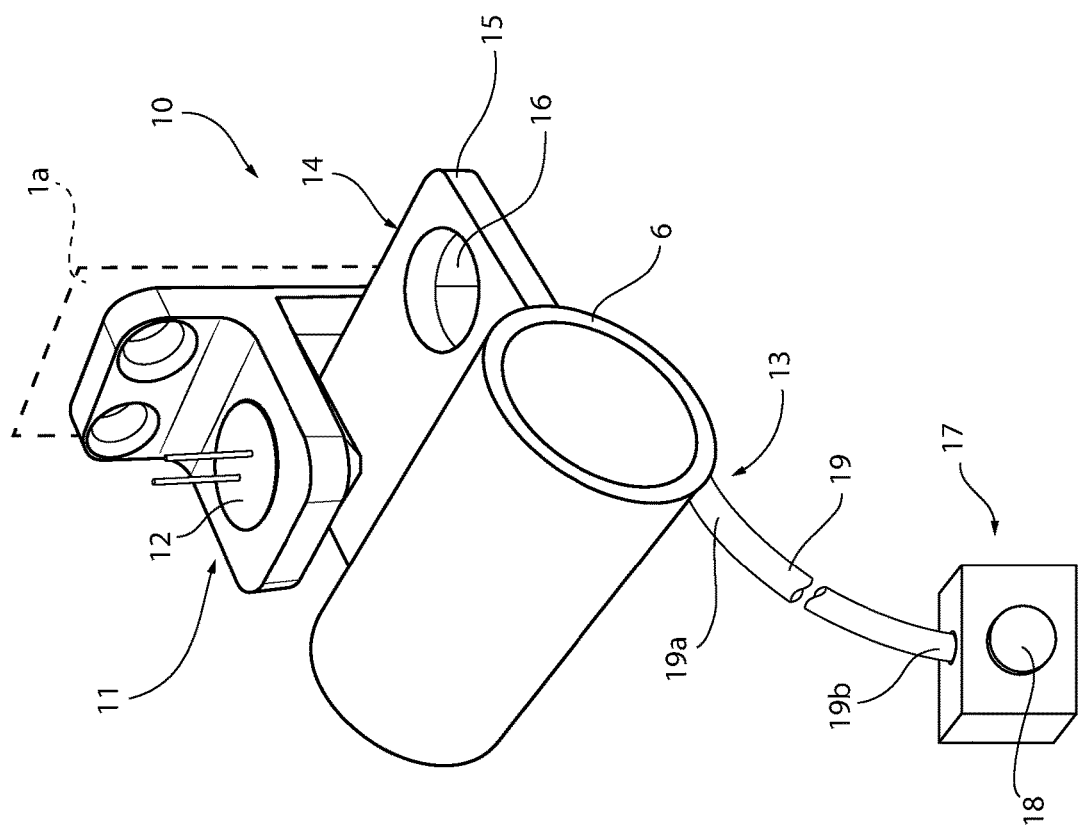
FIG. 2 is a schematic perspective view of a portion of the safety system according to the invention in a first operating condition.

Referring to FIGS. 2 and 3, the safety system 10 comprises optical detection means 11 configured to emit a signal as a function of the position of the anchoring element 6.

In particular, these optical detection means 11 comprise a source 12 of light radiation, for example an LED (Light Emitting Diode), and a receptor element 13 for light radiation arranged so as to detect electromagnetic radiation emitted by the source 12 as a function of the position of the anchoring element 6. Clearly, the source 12 is connected to an electrical power source that, supplying voltage/current to the latter, enables the continuous emission of light radiation.

More specifically, the safety system 10 comprises a shielding element 14 rigidly carried by the anchoring element 6, for example made like a flange 15, extending from a sleeve fixed to the rod 7. This shielding element 14 defines a through opening 16, which enables the passage of light radiation between the source 12 and the receptor 13. In particular, the opening 16 does not house any element inside, enabling the free passage of the light radiation towards the receptor element 13 through it.

According to the embodiment described, the source 12, i.e., the LED element, is carried by a support element fixed in relation to the wall 1*a* of the door 1 and is turned so that it faces the flange 15. The movement of the flange 15, carried by the anchoring element 6 occludes, or fails to occlude, the passage of the light source through the opening 16 between the source 12 and the receptor 13.

The receptor 13 is connected to signalling means 17 configured to signal to the user if enough light radiation provided by the source 12 is detected. These signalling means 17 are preferably optically connected to said receptor and comprise a warning light 18. Clearly, the warning light 18 may be any colour or shape, depending on the type of vehicle.

In particular, the receptor 13 comprises an optical fibre 19, a first end 19*a* thereof is housed facing the light source 12, carried by the support element fixed to the wall 1*a* and a second end 19*b* is connected to the signalling means 17 and forms the above-mentioned warning light 18.

Advantageously, a safety system 10 is provided for each of the anchoring elements 6 and each of these is advantageously housed inside the space 9.

As illustrated in FIG. 4, preferably each signalling means 17 is integrated into a single signalling device 20 comprising as many warning lights 18 as there are safety systems 10. This signalling device 20 preferably comprises a jig 21 defining multiple holes each housing a warning light 18.

More preferably, this jig 21 is housed near the actuator means 3 or in any other position of the door 1 which can be seen by a user. Obviously, the signalling means 17 may be arranged in other parts of the vehicle, for example in a driving cab or cockpit.

The operation of the embodiment of the door 1 comprising a safety system according to the invention described above is the following.

Imagining that the door 1 is in an open operating condition, the user moves the handle 5 so that, thanks to the transmission 4, the anchoring means 6 fix the door 1 to the frame 2. In this condition, the plate 15 covers the light source 12 and, thus, the optical fibre 19 end 19*a* does not detect enough light to illuminate the warning light 18 placed in the jig 21 adjacent to the handle 5. When the rod 7 is placed in the correct position, the light source 12 faces the opening 16 and the end 19*a* of the optical fibre 19. The latter thus receives enough light to illuminate the warning light 18.

The user may, thus, easily, visually control the correct positioning of each rod and understand whether there has been a breakage in the transmission 4 affecting the correct closure of the door 1.

The operation is similar in the opposite case, from closure to opening, and the switching off of each light guarantees the disengagement of the door 1 in relation to the frame 2.

From the above, the advantages of a door equipped with a safety system according to the invention are clear.

Thanks to the safety system proposed, it is possible to easily and quickly check the correct closure of the vehicle door. In particular, the system described is extremely simple, uses few elements, and, thus, has a working life that is virtually unlimited.

In particular, it is possible to visually check, in just one glance, the positioning of each anchoring element.

In addition, the use of a light source and optical fibre makes it possible to provide a system that complies with the aeronautics sector regulations regarding door closing systems.

In particular, the system proposed is very reliable, low-consumption, and easy and inexpensive to maintain. In particular, there is no possibility of malfunctioning since the signalling means would not signal light, neither in the case of a mechanical malfunction, nor in the case of a light source 12 malfunction. In particular, compared to the system U.S. Ser. No. 10/746,378 B2, the system is simpler and more reliable thanks to the absence of the intermediate element illustrated here.

In addition, the system according to the invention may be used in environments containing explosive mixtures since the use of electrical power is limited and the transmission in the door is basically optical.

Finally, it is clear that changes and variations may be made to the door equipped with the safety system according to this invention that, in any case, do not depart from the scope of protection defined by the claims.

Clearly, it is possible that the closing system is made in a different way, i.e., that the mechanical transmission 4 comprises elements other than those described, or that the anchoring element 6 is present in different numbers, shapes, and types.

Similarly, the safety system 10 may comprise different light sources 12, receptors 13, and signalling means 17.

Again, the source and the receptor could be fixed to the anchoring element instead of to the door.

The invention claimed is:

1. A door configured to be selectively closed and fixed on a frame,
    said door comprising a closing system equipped with actuator means, at least one anchoring element and a mechanical transmission, said actuator means being configured to move said at least one anchoring element between a first operative condition in which the at least one anchoring element does not cooperate with said frame, leaving said door free to move with respect to the frame, and a second operative condition in which the at least one anchoring element cooperates with said frame to fix said door to the the frame, said door comprising a safety system for said at least one anchoring element, said safety system comprising a source of light radiations and a receptor of said radiations, said source being integral with one of said door and said anchoring element, said receptor being integral with said one of said door and said anchoring element, said receptor being optically connected to a signalling means, and said signalling means signalling the positioning of said anchoring element in said second operating condition when said receiver receives said light radiation from said source, wherein said safety system comprises a shielding element, said shielding element being integral with the other of said door and said anchoring element, said shielding element preventing a passage of light radiation between said source and said receptor when said anchoring element is in said first operating condition and allowing the passage of light radiation when said anchoring element is in said second operating condition, wherein said shielding element comprises a flange integral with said other of said door and said anchoring element, and said flange-being provided with a through hole-configured to enable the unaltered passage of said light radiation.

2. The door according to claim 1, wherein said closing system comprises a plurality of anchoring elements, each equipped with a respective safety system.

3. The door according to claim 2, in which said signalling means of each anchoring element are carried by a same signalling device.

4. The door according to claim 3, wherein said signalling means are carried by said door.

5. The door according to claim 1, wherein said closing system and said safety system are housed inside a space defined by walls of said door.

6. The door according to claim 1, wherein said source comprises an LED element.

7. The door according to claim 1, wherein said receiving element comprises an optical fibre connected to said signalling means.

8. The door according to claim 7, wherein said optical fibre comprises a first end facing said source and said shielding element and a second end defining a warning light of said signalling means.

9. The door according to claim 1, wherein said hole does not house any element inside so as to enable passage of said light radiation through said hole without alterations.

10. A vehicle comprising the door according to claim 1.

* * * * *